EDWARD P. HERRICK.
Improvement in Egg Carriers.
No. 5,814.
Reissued March 31, 1874.
FIG. I.
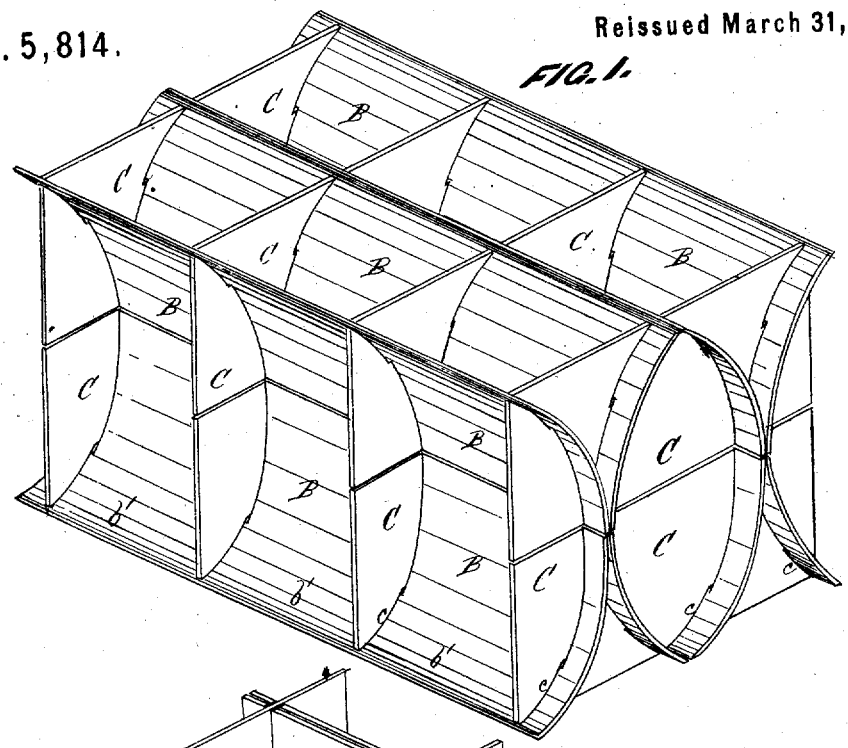
FIG. II.
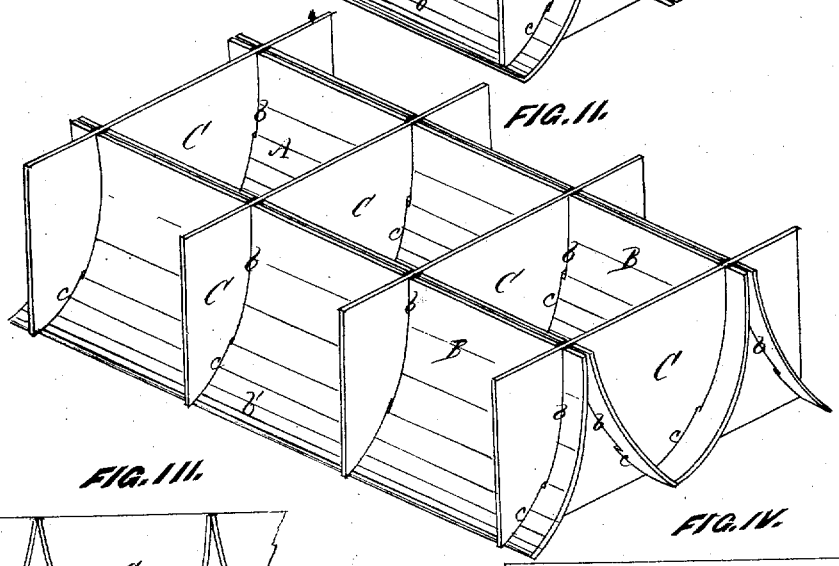
FIG. III.
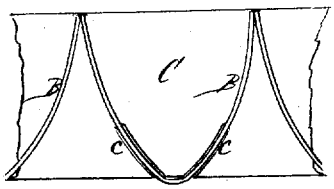
FIG. IV.
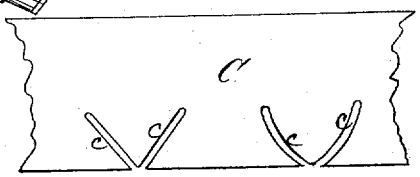
FIG. V
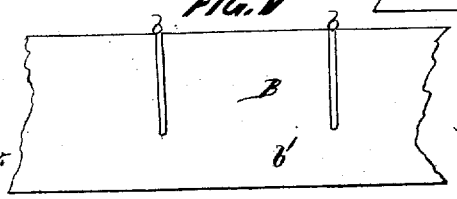
Witnesses.
J. B. Griffinhagen.
Wm. A. LeRoy.
Inventor:
Edward P. Herrick
By Peck & Miatt, Attys
Chicago, Ill.
A.M. PHOTO-LITHOGRAPHIC CO. N.Y. (OSBORNE'S PROCESS.)

UNITED STATES PATENT OFFICE.

EDWARD P. HERRICK, OF CHICAGO, ILLINOIS.

IMPROVEMENT IN EGG-CARRIERS.

Specification forming part of Letters Patent No. 122,889, dated January 23, 1872; reissue No. 5,814, dated March 31, 1874; application filed September 11, 1873.

*To all whom it may concern:*

Be it known that I, EDWARD P. HERRICK, of the city of Chicago, in the county of Cook and State of Illinois, have invented an Improvement in Egg-Carriers, of which the following is a full, clear, and exact description, which will enable others skilled in the art to which my invention appertains to make and use the same, reference being had to the accompanying drawing, forming a part hereof, and in which—

Figure 1 is a perspective view of a section of my device, showing two layers of compartments with the open ends joined; Fig. 2, a similar view of one-half of the above; Fig. 3, an elevation, showing the method of joining all the sides; Fig. 4, a perspective view of a portion of one of the sides, and Fig. 5 a similar view of the other side.

Like letters of reference indicate like parts.

My invention relates to the construction of a case or carrier for packing and transporting eggs, provided with a separate pocket or compartment for each egg; and consists of one or more trays, constructed of transverse and interlocked strips of pasteboard or other suitable material, and so interlocked and joined together as to form the sides and bottom of each pocket or compartment, as hereinafter described.

In the drawing, A A are compartments, formed each of the proper size for holding an egg, fruit, or anything desired. B B are division pieces or strips, constituting two sides and the bottom of each compartment; and C C are the pieces or strips which form the other two sides. The side pieces B are furnished with straight slots *b*, projecting upward from the bottom and parallel to the ends of said pieces. The sides C are also slotted on the bottom edges, but in a line diagonal with the bottom edge, as shown at *c* in Fig. 4.

The method of constructing the compartments is as follows: The strips forming the sides are cut of a width corresponding to the depth of the compartments, or the compartments can be made in halves, the upper half constituting a cap or cover, in which case the side pieces of each separate set of compartments would be of only half the depth of said compartments. After the strips have been cut of the right width, the slots *b* and *c* are formed with a saw, and the strips are then ready to be put together. The number of compartments in any set will, of course, depend on the size of each compartment and the length of the strips. To connect the pieces B and C so as to form the compartments A, it is necessary to pass the slots *b* of one set of strips B into the slots *c* in the other set. After connecting the strips B and C, as described, the position of the former will be in line of the slot *c*; but, as said slot extends upward only part of the width of the strip, it is evident that the portion of the strip above the slot can readily be made to deviate from the line referred to. The slots *c* are made so near to each other that their lines, on being continued sufficiently far, would intersect, so that in joining them with slots *b* the top of the pieces B and B bear against each other; and as they do this with an equal pressure the resultant line of direction for the top of said pieces will be perpendicular to the edge of the pieces C. The bottom *b'* of the compartments A is formed by starting the slots *c* so nearly at the same point that the lower edges of the strips B will meet after the sides B C have been put together. The slots *c* may have a curved form, as shown in Fig. 4, which will assist in determining the line of the curve to the bottom *b'*, and also in directing the sides B upward in a vertical direction. The angle of the straight slot with the bottom edge of the strip C can also be varied to adapt it to different uses. The slot *b* must always correspond in depth to the slot *c*, but the depth of both can be changed in order to give more or less firmness to the sides and bottom. When it is desired to make a set of compartments particularly firm or tight, or for any other reason, the two sides and bottom B *b'* can consist of a single continuous piece, as shown in Fig. 3.

In practice, I make and use a series of trays or compartments, as shown in Fig. 2, of sufficient depth to each compartment to hold an egg, and as each series of compartments are filled, they are placed one upon the other, in a case or box for that purpose, and are then ready for transportation. Each tray or series of compartments can be lifted from the case by the side pieces C, which, so far as I am aware, cannot be done in other egg-carriers.

I prefer, in general use, to make the bottom $b'$ in two parts, as I am thereby enabled to secure good ventilation through the compartments.

It will be observed, from the foregoing description, that the construction of each compartment is such as to give an elastic support to whatever is placed therein, superior to any attained, so far as I am aware, in previous egg-carriers; and that the bottom to each compartment is formed without the use or necessity of a separating diaphragm between each series or set of compartments.

Having thus described the nature and object of my invention, what I claim as new, and desire to secure by Letters Patent, is—

1. An egg-carrier consisting of a tray constructed of transverse and interlocked strips, and divided by means of said strips into egg-receiving and egg-supporting pockets or compartments having closed bottoms, substantially as specified.

2. The side pieces B, provided with straight slots $b$, in combination with pieces C, having inclined or curved slots $c$, for the purpose specified.

EDWARD P. HERRICK.

Witnesses:
N. C. GRIDLEY,
HORATIO M. SMITH.